United States Patent
Guo et al.

(10) Patent No.: US 11,423,646 B2
(45) Date of Patent: Aug. 23, 2022

(54) LOOP CLOSURE DETECTION METHOD, MOBILE DEVICE AND COMPUTER READABLE STORAGE MEDIUM

(71) Applicant: UBTECH ROBOTICS CORP LTD, Shenzhen (CN)

(72) Inventors: Rui Guo, Shenzhen (CN); Zhichao Liu, Shenzhen (CN); Chenchen Jiang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 29 days.

(21) Appl. No.: 16/953,378

(22) Filed: Nov. 20, 2020

(65) Prior Publication Data
US 2022/0036065 A1 Feb. 3, 2022

(30) Foreign Application Priority Data
Aug. 3, 2020 (CN) .......................... 202010766352.3

(51) Int. Cl.
G06V 20/00 (2022.01)
G06V 10/75 (2022.01)
G06V 10/44 (2022.01)
G01C 21/20 (2006.01)
H04N 5/247 (2006.01)

(52) U.S. Cl.
CPC ............. *G06V 20/00* (2022.01); *G01C 21/20* (2013.01); *G06V 10/44* (2022.01); *G06V 10/751* (2022.01); *H04N 5/247* (2013.01)

(58) Field of Classification Search
CPC ............ G06K 9/00624; G06K 9/4604; G06K 9/6202; G01C 21/20; H04N 5/247
See application file for complete search history.

(56) References Cited

U.S. PATENT DOCUMENTS

2020/0202550 A1* 6/2020 Advani .............. G02B 27/0101

FOREIGN PATENT DOCUMENTS

CN 110070615 A * 7/2019
CN 110660098 A * 1/2020

* cited by examiner

*Primary Examiner* — Nancy Bitar
*Assistant Examiner* — Xiao Liu (57) ABSTRACT

A loop closure detection method, a mobile device, and a computer readable storage medium are provided. The method includes: collecting images in different detection directions simultaneously through C0 cameras installed on the mobile device to obtain an image data group comprising C0 images; calculating feature information of each image in the image data group; performing a loop closure detection in C0 sub-threads respectively based on the feature information to obtain a loop closure detection result of each sub-thread; and determining a loop closure detection result of the mobile device based on the loop closure detection result of each sub-thread. In this manner, cross detections in a plurality of detection directions can be realized, which breaks through the limitation of loop closure detection in the prior art with respect to path direction, avoids repeated paths in the same direction, and greatly improves the mapping efficiency.

20 Claims, 6 Drawing Sheets

LOOP CLOSURE DETECTION METHOD, MOBILE DEVICE AND COMPUTER READABLE STORAGE MEDIUM

CROSS REFERENCE TO RELATED APPLICATIONS

The present disclosure claims priority to Chinese Patent Application No. 202010766352.3, filed Aug. 3, 2020, which is hereby incorporated by reference herein as if set forth in its entirety.

BACKGROUND

1. Technical Field

The present disclosure relates to mobile devices technology, and particularly to a loop closure detection method, a mobile device, and a computer readable storage medium.

2. Description of Related Art

Loop closure detection refers to a process of detecting whether the mobile device has returned to a previously visited location. In the prior art, mobile devices such as robots or unmanned aerial vehicles require that the path and direction of loop closure detection have to be consistent with the path and direction during mapping so as to output accurate loop closure detection results, which often makes a mobile device needed to take many repetitive paths in the same direction during mapping and causes the problem of low efficiency in mapping.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" (or "comprising") indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
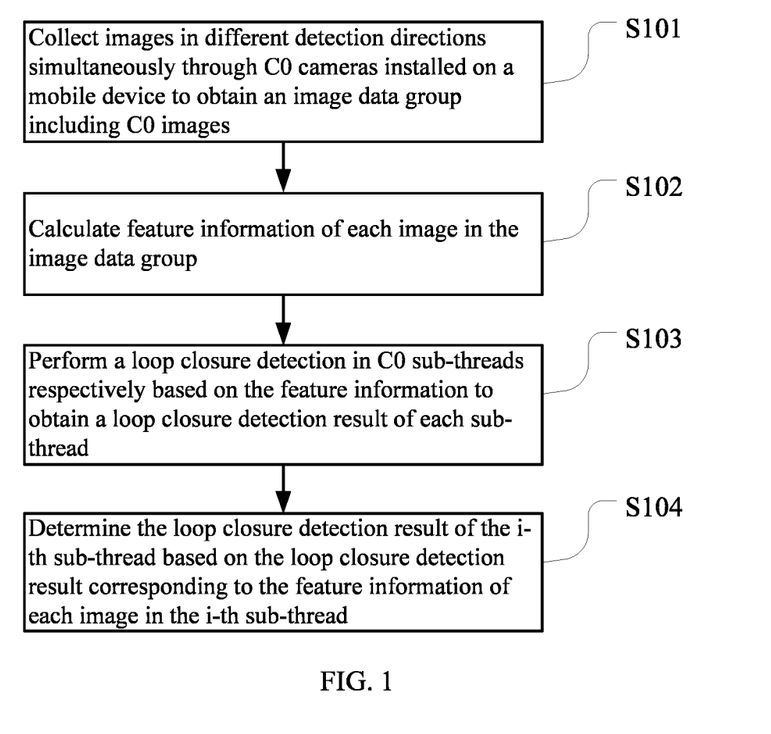
FIG. 1 is a flow chart of a loop closure detection method according to an embodiment of the present disclosure.
Figure 5:
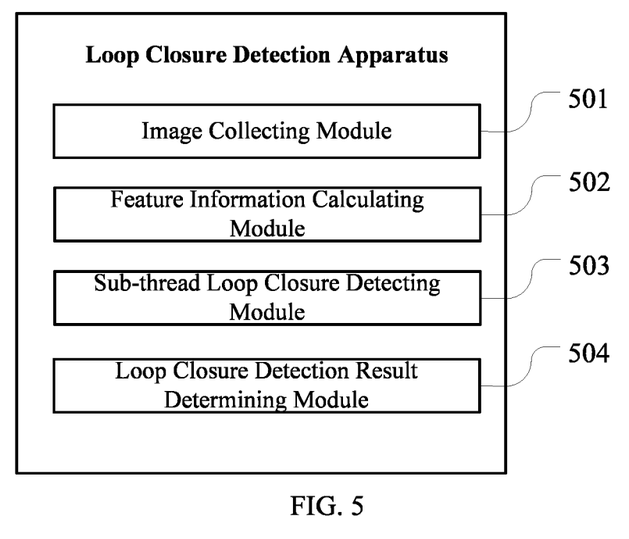
FIG. 5 is a schematic block diagram of a loop closure detection apparatus according to an embodiment of the present disclosure.
Figure 6:
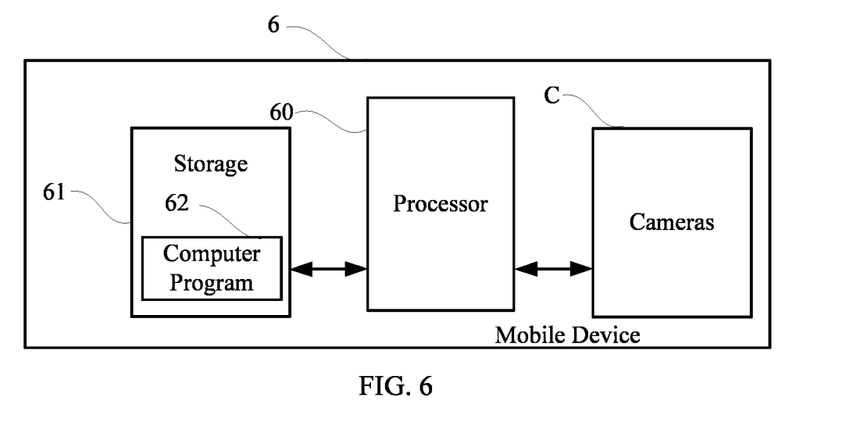
FIG. 6 is a schematic block diagram of a mobile device according to an embodiment of the present disclosure.

FIG. 1 is a flow chart of a loop closure detection method according to an embodiment of the present disclosure. In this embodiment, a loop closure detection method for a mobile device is provided. The method is a computer-implemented method executable for a processor, which may be implemented in a loop closure detection apparatus as shown in FIG. 5 or a mobile device as shown in FIG. 6. As shown in FIG. 1, the loop closure detection method includes the following steps.

S101: collecting images in different detection directions simultaneously through C0 cameras installed on the mobile device to obtain an image data group including C0 images.

In this embodiment, the mobile device can be, but is not limited to, a robot, an unmanned aerial vehicle, and other mobile device that needs to perform loop closure detections during mapping.

Figure 2:
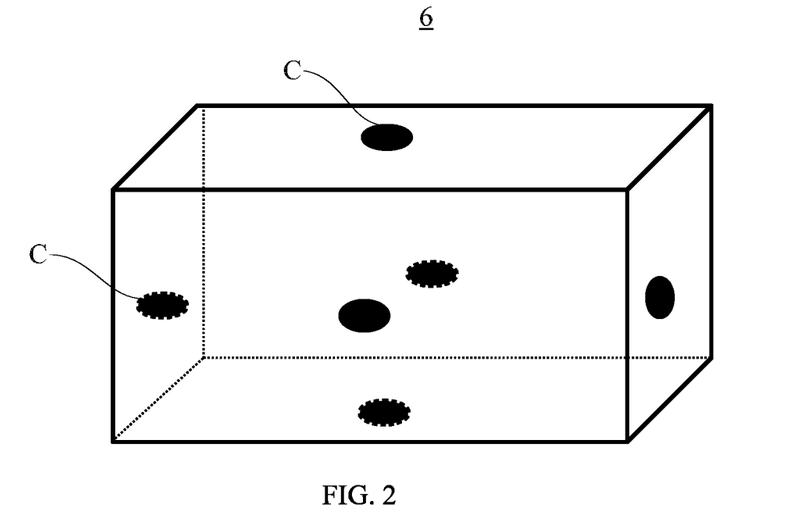
FIG. 2 is a schematic diagram of a layout of cameras on a mobile device according to the embodiment of FIG. 1.

In which, C0 is an integer larger than 1, and the specific value can be set according to the actual needs. The cameras are numbered from 0 to C0−1. In one embodiment, the cameras can be arranged on the mobile device according to actual conditions, where it will be preferable to ensure that the detection directions of any two of the cameras are different from each other, and there is no overlap between the view fields of any two of the cameras, where the detection direction of each camera refers to the direction of the camera for capturing the image. FIG. 2 is a schematic diagram of a layout of cameras on a mobile device according to the embodiment of FIG. 1. As shown in FIG. 2, the cube represents a mobile device 6 as shown in FIG. 6, and the solid circle represents cameras C. The six cameras C (supposed that C0=6) are respectively disposed on six faces of the mobile device 6 to collect images synchronously in six detection directions of the upper, lower, left, right, front, and back of the mobile device 6. It should be noted that, FIG. 2 is only an example of the layout of the cameras C on the mobile device 6. In actual applications, other layouts can be adopted according to actual needs, which is not limited herein.

The method of this embodiment can be applied to both laser and visual SLAM (simultaneous localization and mapping) mapping scenarios. Taking visual SLAM as an example, after starting the visual SLAM mapping mode, the mobile device 6 can first load a configuration file of the cameras C, read the amount of cameras C (i.e., C0) from the configuration file, then create a main thread and C0 independent sub-threads at the same time. In which, the sub-threads are numbered from 0 to C0−1, each sub-thread performs a loop closure detection task which corresponds to a loop closure detection in one detection direction, and the main thread summaries and analyze the loop closure detection result of each sub-thread to obtain the final loop closure detection result.

At a preset time interval, for example, after waiting for a key frame signal, the main thread performs an image collection through all the cameras C disposed on the mobile device 6 synchronously to obtain a group of multiocular camera image data, that is, the image data group, which are denoted as $I_0 \ldots _{C0-1}$. $I_0 \ldots _{C0-1}$ to represent a total of C0 images numbered from 0 to C0−1 which correspond to the cameras C numbered from 0 to C0−1. After the image collection is completed, the main thread can calculate feature information through step S102.

S102: calculating feature information of each image in the image data group.

In this embodiment, taking the j-th ($0 \leq j < C0$) image in the image data group as an example, the process of calculating the feature information will be described in detail as follows.

First, a corner point feature set (denoted as $F_j$) of the j-th image in the image data group is extracted, and a descriptor set (denoted as $D_j$) corresponding to the corner point feature set is calculated. In one embodiment, the extraction of the corner feature and the calculation of the corresponding descriptor can use existing technologies. As an example, the corner point feature can be any commonly used corner point feature including Harris, ORB, SIFT, SURF, or the like, which will not be repeated herein.

After the above-mentioned calculation is completed, the corner point feature set and the descriptor set are used as feature information of the j-th image in the image data group.

According to the above-mentioned process, each of the images in the image data group is traversed to obtain the feature information that is, the corner point feature set (denoted as $F_0 \ldots _{C0-1}$) of each image and the corresponding descriptor set (denoted as $D_0 \ldots _{C0-1}$), of each image.

S103: performing a loop closure detection in C0 sub-threads respectively based on the feature information to obtain a loop closure detection result of each sub-thread.

After the main thread completes the calculation of the feature information, it distributes the calculated feature information (i.e., $F_0 \ldots _{C0-1}$ and $D_0 \ldots _{C0-1}$) to the C0 sub-threads in turn, and then enters a loop closure monitoring mode to wait the sub-threads to return the loop closure detection result.

Figure 3:
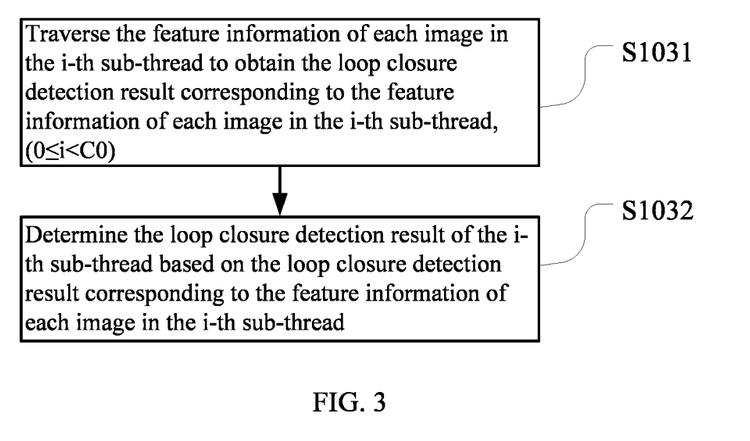
FIG. 3 is a flow chart of performing a loop closure detection based on feature information in a certain sub-thread according to the embodiment of FIG. 1.

FIG. 3 is a flow chart of performing a loop closure detection based on feature information in a certain sub-thread according to the embodiment of FIG. 1. In this embodiment, as shown in FIG. 3, taking the i-th ($0 \leq i < C0$) sub-thread as an example, the loop closure detection in the sub-thread will be described in detail as follows.

S1031: traversing the feature information of each image in the i-th sub-thread to obtain the loop closure detection result corresponding to the feature information of each image in the i-th sub-thread, ($0 \leq i < C0$).

Figure 4:
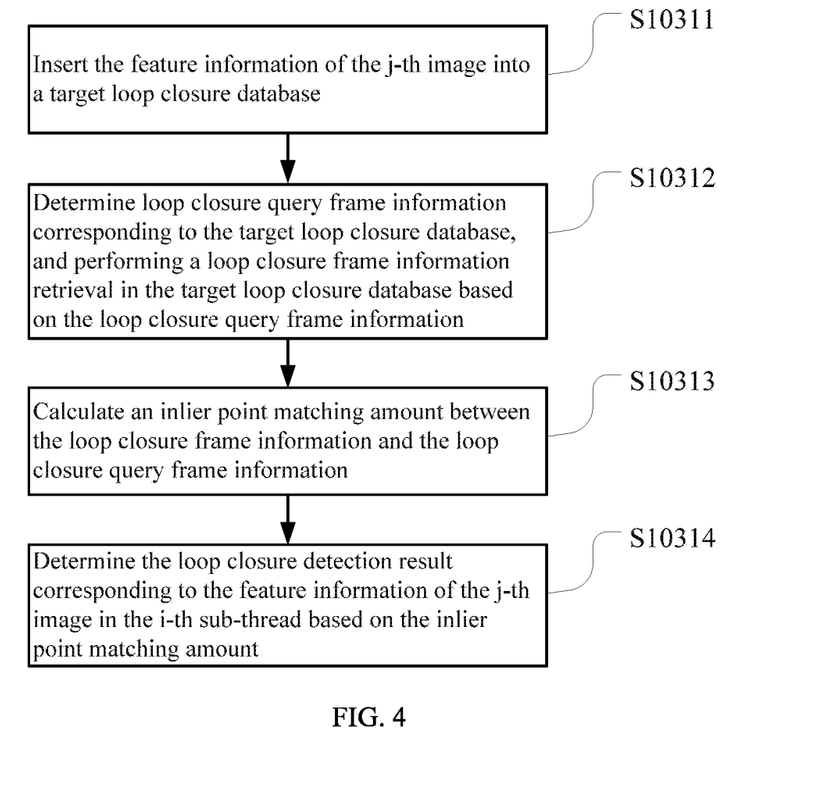
FIG. 4 is a flow chart of an example of performing a loop closure detection on an image according to the embodiment of FIG. 1.

FIG. 4 is a flow chart of an example of performing a loop closure detection on an image according to the embodiment of FIG. 1. As shown in FIG. 4, taking the j-th image of the i-th sub-thread as an example, the loop closure detection includes the following steps.

S10311: inserting the feature information (i.e., $F_j$ and $D_j$) of the j-th image into a target loop closure database.

The target loop closure database is the j-th loop closure database (denoted as $Db_j$) of the i-th sub-thread. In this embodiment, it needs to construct as many loop closure databases as the feature information of the images received by the i-th sub-thread, where the loop closure database is used to store and process the feature information of the images with the corresponding number. The construction and retrieval of the loop closure database can use any common method including DBOW, CNN, hash table, or the like, which will not be detailed herein.

S10312: determining loop closure query frame information corresponding to the target loop closure database, and performing a loop closure frame information retrieval in the target loop closure database based on the loop closure query frame information.

In this embodiment, a sequence number of the loop closure query frame information in the target loop closure database is determined based on the following formula:

$$c = (j+i) \% \; C0;$$

where, c is the sequence number of the loop closure query frame information in the target loop closure database, and $0 \leq c < C0$.

Then, the corner point feature set (denoted as $F_c$) in the loop closure query frame information and the corresponding descriptor set (denoted as $D_c$) can be obtained according to the sequence number, and the loop closure frame information is retrieved from the target loop closure database. If the loop closure frame information that meets a preset score threshold is not found, the subsequent steps will not be executed, and the loop closure detection result corresponding to the feature information of the j-th image in the i-th sub-thread is directly determined to be null; and if the loop closure frame information that meets the preset score threshold is found, it continues to execute step S10313.

S10313: calculating an inlier point matching amount between the loop closure frame information and the loop closure query frame information.

Based on the corner point feature set (denoted as $F_{pre}$) in the loop closure frame information and the corresponding descriptor set (denoted as $D_{pre}$) as well as the corner point feature set in the loop closure query frame information and the corresponding descriptor set, the inlier point matching amount between the two can be calculated (denoted as M). In one embodiment, the calculation of the inlier point can use any common method including RANSAC, which will not be repeated herein.

S10314: determining the loop closure detection result corresponding to the feature information of the j-th image in the i-th sub-thread based on the inlier point matching amount.

In this embodiment, if the inlier point matching amount is less than a preset matching amount threshold (denoted as M0), it is determined that the loop closure detection result corresponding to the feature information of the j-th image in the i-th sub-thread is null; otherwise, if the inlier point matching amount is larger than or equal to the matching amount threshold, the loop closure detection is determined as valid, and information such as the current frame index, loop closure frame index, image number in the current frame, corresponding loop closure frame image number, and inlier point matching relationship are cached to take as the loop closure detection result corresponding to the feature information of the j-th image in the i-th sub-thread.

According to the above-mentioned process, each of the images in the image data group is traversed to obtain the loop closure detection result corresponding to the feature information of each image in the i-th sub-thread.

S1032: determining the loop closure detection result of the i-th sub-thread based on the loop closure detection result corresponding to the feature information of each image in the i-th sub-thread.

In this embodiment, it can select the loop closure detection result with the largest inlier point matching amount from the loop closure detection result corresponding to the feature information of each image in the i-th sub-thread to take as the loop closure detection result of the i-th sub-thread, and then the loop closure detection result is feed-backed to the main thread.

In some cases, if all the images fail to match, the loop closure detection result of the i-th sub-thread will eventually be null, and a data structure with special symbol (e.g., a null symbol) can be feedbacked to the main thread to inform the main thread that the loop closure detection result is invalid.

According to the above-mentioned process, each sub-thread is traversed to obtain the loop closure detection result of each sub-thread.

S104: determining the loop closure detection result of the i-th sub-thread based on the loop closure detection result corresponding to the feature information of each image in the i-th sub-thread.

In this embodiment, if the loop closure detection result feedbacked by the sub-threads are all invalid, it can be determined that there is no loop closure in the current frame; otherwise, the loop closure detection result with the largest inlier point matching amount is selected from the loop closure detection results of the sub-threads to take as the loop closure detection result of the mobile device.

It should be noted that FIG. 1 shows only the process of performing the loop closure detection for the current key frame. In actual applications, the loop closure detection can be performed on each key frame in the entire mapping process until the mapping mode is ended. At this time, the main thread terminates after issuing a termination instruction to each sub-thread, and each sub-thread terminates after receiving the termination instruction.

In this embodiment, it does not require consistent directions when detecting loop closures in the same path. For example, at an intersection, assuming that the SLAM mapping direction is from east to west, loop closures may be detected when the mobile device passes through the intersection from east to west, from west to east, from south to north, and from north to south. In this way, while shortening the mapping path, it can also ensure that a large number of accurate loop closure detection results can be generated, which can greatly improve the mapping quality and mapping efficiency of SLAM, thereby improving the navigation and positioning accuracy.

To sum up, in this embodiment, it collects images in different detection directions simultaneously through C0 cameras installed on a mobile device to obtain an image data group including C0 images, where C0 is an integer larger than 1; calculates feature information of each image in the image data group; performs a loop closure detection in C0 sub-threads respectively based on the feature information to obtain a loop closure detection result of each sub-thread, where each sub-thread corresponds to the loop closure detection in one detection direction; and determines a loop closure detection result of the mobile device based on the loop closure detection result of each sub-thread. In this embodiment, the image data groups in different detection directions are collected by a multiocular camera so as to calculate the corresponding feature information, and the loop closure detection is performed in a plurality of sub-threads corresponding to each detection direction, thereby achieving cross detections in a plurality of detection directions, which breaks through the limitation of loop closure detection in the prior art with respect to path direction, avoids repeated paths in the same direction, and greatly improves the mapping efficiency.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 5 is a schematic block diagram of a loop closure detection apparatus according to an embodiment of the present disclosure. As shown in FIG. 5, in this embodiment, corresponding to the loop closure detection method of the foregoing embodiment, a loop closure detection apparatus is provided.

The loop closure detection apparatus can include:

an image collecting module 501 configured to collect images in different detection directions simultaneously through C0 cameras installed on the mobile device to obtain an image data group including C0 images, where C0 is an integer larger than 1;

a feature information calculating module 502 configured to calculate feature information of each image in the image data group;

a sub-thread loop closure detecting module 503 configured to perform a loop closure detection in C0 sub-threads respectively based on the feature information to obtain a loop closure detection result of each sub-thread, where each sub-thread corresponds to the loop closure detection in one detection direction; and a loop closure detection result determining module 504 configured to determine a loop closure detection result of the mobile device based on the loop closure detection result of each sub-thread.

Furthermore, the feature information calculating module 502 can include:

a corner point feature extracting unit configured to extract a corner point feature set of the j-th image in the image data group, where $0 \leq j < C0$; a descriptor calculating unit configured to calculate a descriptor set corresponding to the corner point feature set; and a feature information determining unit configured to use the corner point feature set and the descriptor set as feature information of the j-th image in the image data group.

Furthermore, the sub-thread loop closure detecting module 503 can include:

a sub-thread detecting unit configured to traverse the feature information of each image in the i-th sub-thread to obtain the loop closure detection result corresponding to the feature information of each image in the i-th sub-thread, where $0 \leq i < C0$; and a sub-thread detection result determining unit configured to determine the loop closure detection result of the i-th sub-thread based on the loop closure detection result corresponding to the feature information of each image in the i-th sub-thread.

Furthermore, the sub-thread detecting unit can include:

a feature information inserting subunit configured to insert the feature information of the j-th image into a target loop closure database, where the target loop closure database is the j-th loop closure database of the i-th sub-thread, where $0 \leq j < C0$;

a loop closure frame information retrieval subunit configured to determine loop closure query frame information corresponding to the target loop closure database, and performing a loop closure frame information retrieval in the target loop closure database based on the loop closure query frame information;

an inlier point matching amount calculating subunit configured to calculate an inlier point matching amount between the loop closure frame information and the loop closure query frame information, in response to the loop closure frame information being retrieved; and a loop closure detection result determining subunit configured to determine the loop closure detection result corresponding to the feature information of the j-th image in the i-th sub-thread based on the inlier point matching amount.

Furthermore, the loop closure frame information retrieval subunit is configured to determine a sequence number of the loop closure query frame information in the target loop closure database based on the following formula:

$$c = (j+i) \% C0;$$

where, c is the sequence number of the loop closure query frame information in the target loop closure database, and $0 \leq c < C0$.

Furthermore, the sub-thread detection result determining unit is configured to select the loop closure detection result with the largest inlier point matching amount from the loop closure detection result corresponding to the feature information of each image in the i-th sub-thread to take as the loop closure detection result of the i-th sub-thread.

Furthermore, the loop closure detection result determining module is configured to select the loop closure detection result with the largest inlier point matching amount from the loop closure detection results of the sub-threads to take as the loop closure detection result of the mobile device.

Those skilled in the art can clearly understand that, for the convenience and conciseness of description, the specific operation processes of the above-mentioned apparatus, modules, and units can refer to the corresponding processes in the foregoing method embodiment, which will not be repeated herein.

In the above-mentioned embodiments, the description of each embodiment has its focuses, and the parts which are not described or mentioned in one embodiment may refer to the related descriptions in other embodiments.

FIG. 6 is a schematic block diagram of a mobile device according to an embodiment of the present disclosure. A mobile device 6 is provided. For ease of description, only parts related to this embodiment are shown.

As shown in FIG. 6, in this embodiment, the mobile device 6 includes a processor 60, a storage 61, a computer program 62 stored in the storage 61 and executable on the processor 60, and cameras C, When executing (instructions in) the computer program 62, the processor 60 implements the steps in the above-mentioned embodiments of the loop closure detection method, for example, steps S101-S104 shown in FIG. 1. Alternatively, when the processor 60 executes (instructions in) the computer program 62, the functions of each module/unit in the above-mentioned device embodiments, for example, the functions of the modules 501-504 shown in FIG. 5 are implemented.

Exemplarily, the computer program 62 may be divided into one or more modules/units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the mobile device 6.

The mobile device 6 may include, but is not limited to, the processor 60 and the storage 61. It can be understood by those skilled in the art that FIG. 6 is merely an example of the mobile device 6 and does not constitute a limitation on the mobile device 6, and may include more or fewer components than those shown in the figure, or a combination of some components or different components. For example, the mobile device 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the mobile device 6, for example, a hard disk or a memory of the mobile device 6. The storage 61 may also be an external storage device of the mobile device 6, for example, a plug-in hard disk, a smart media card (SMC), a secure digital (SD) card, flash card, and the like, which is equipped on the mobile device 6. Furthermore, the storage 61 may further include both an internal storage unit and an external storage device, of the mobile device 6. The storage 61 is configured to store the computer program 62 and other programs and data required by the mobile device 6. The storage 61 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/mobile device and method may be implemented in other manners. For example, the above-mentioned apparatus/mobile device embodiment is merely exemplary. For example, the division of modules or units is merely a logical functional division, and other division manner may be used in actual implementations, that is, a plurality of units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to a plurality of network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented loop closure detection method for a mobile device, comprising steps of:
    collecting images in different detection directions simultaneously through C0 cameras installed on the mobile device to obtain an image data group comprising C0 images, wherein C0 is an integer larger than 1;
    calculating feature information of each image in the image data group;
    performing a loop closure detection in C0 sub-threads respectively based on the feature information to obtain a loop closure detection result of each sub-thread, wherein each sub-thread corresponds to the loop closure detection in one detection direction; and
    determining a loop closure detection result of the mobile device based on the loop closure detection result of each sub-thread;
    wherein the step of determining the loop closure detection result of the mobile device based on the loop closure detection result of each sub-thread comprises:
    selecting the loop closure detection result with a largest inlier point matching amount from the loop closure detection results of the sub-threads to take as the loop closure detection result of the mobile device.

2. The method of claim 1, wherein the step of calculating the feature information of each image in the image data group comprises:
    extracting a corner point feature set of a j-th image in the image data group, wherein $0 \leq j < C0$;
    calculating a descriptor set corresponding to the corner point feature set; and
    using the corner point feature set and the descriptor set as feature information of the j-th image in the image data group.

3. The method of claim 1, wherein the step of performing the loop closure detection in C0 sub-threads respectively based on the feature information to obtain the loop closure detection result of each sub-thread comprises:
    traversing the feature information of each image in a i-th sub-thread to obtain the loop closure detection result corresponding to the feature information of each image in the i-th sub-thread, wherein $0 \leq i < C0$; and
    determining the loop closure detection result of the i-th sub-thread based on the loop closure detection result corresponding the feature information of each image in the i-th sub-thread.

4. The method of claim 3, wherein the step of traversing the feature information of each image in the i-th sub-thread to obtain the loop closure detection result corresponding to the feature information of each image in the i-th sub-thread comprises:
  inserting the feature information of a j-th image into a target loop closure database, wherein the target loop closure database is a j-th loop closure database of the i-th sub-thread, wherein 0≤j<C0;
  determining loop closure query frame information corresponding to the target loop closure database, and performing a loop closure frame information retrieval in the target loop closure database based on the loop closure query frame information;
  calculating an inlier point matching amount between the loop closure frame information and the loop closure query frame information, in response to the loop closure frame information being retrieved; and
  determining the loop closure detection result corresponding to the feature information of the j-th image in the i-th sub-thread based on the inlier point matching amount.

5. The method of claim 4, wherein the step of determining the loop closure query frame information corresponding to the target loop closure database comprises:
  determining a sequence number of the loop closure query frame information in the target loop closure database based on the following formula:

$c=(j+i)\%C0;$ where, c is the sequence number of the loop closure query frame information in the target loop closure database, and 0≤c<C0.

6. The method of claim 4, wherein the step of determining the loop closure detection result corresponding to the feature information of the i-th image in the i-th sub-thread based on the inlier point matching amount, comprises:
  in response to the inlier point matching amount being less than a preset matching amount threshold, determining that the loop closure detection result corresponding to the feature information of the j-th image in the i-th sub-thread is null; and
  in response to the inlier point matching amount being larger than or equal to the preset matching amount threshold, determining that the loop closure detection is valid, and caching a current frame index, a loop closure frame index, an image number in the current frame, a corresponding loop closure frame image number, and an inlier point matching relationship to take as the loop closure detection result corresponding to the feature information of the j-th image ire the i-th sub-thread.

7. The method of claim 3, wherein the step of determining the loop closure detection result of the i-th sub-thread based on the loop closure detection result corresponding to the feature information of each image in the i-th sub-thread comprises:
  selecting the loop closure detection result with a largest inlier point matching amount from the loop closure detection result corresponding, to the feature information of each image in the i-th sub-thread to take as the loop closure detection result of the i-th sub-thread.

8. The method of claim 1, wherein the method further comprises:
  loading a configuration file of the C0 cameras, reading an amount of the C0 cameras from the configuration file, and creating a main thread and the C0 sub-threads at the same time;
  wherein each of the C0 sub-threads is configured to perform a loop closure detection task which corresponds to a loop closure detection in one detection direction; and
  wherein the main thread is configured to obtain the image data group comprising the C0 images, calculate the feature information of each image in the Image data group, distribute the calculated feature information to the C0 sub-threads in turn, and determine the loop closure detection result of the mobile device based on the loop closure detection result of each of the C0 sub-threads which is feedbacked by each of the C0 sub-threads.

9. A mobile device, comprising:
  C0 cameras;
  a memory;
  a processor; and
  one or more computer programs stored in the memory and executable on the processor, wherein the one or more computer programs comprise:
  instructions for collecting images in different detection directions simultaneously through the C0 cameras to obtain an image data group comprising C0 images, wherein C0 is an integer larger than 1;
  instructions for calculating feature information of each image in the image data group;
  instructions for performing a loop closure detection in C0 sub-threads respectively based on the feature information to obtain a loop closure detection result of each sub-thread, wherein each sub-thread corresponds to the loop closure detection in one detection direction; and
  instructions for determining a loop closure detection result of the mobile device based on the loop closure detection result of each sub-thread;
  wherein the instructions for determining the loop closure detection result of the mobile device based on the loop closure detection result of each sub-thread comprise:
  instructions for selecting the loop closure detection result with a largest inlier point matching amount from the loop closure detection results of the sub-threads to take as the loop closure detection result of the mobile device.

10. The mobile device of claim 9, wherein the instructions for calculating the feature information of each image in the image data group comprise:
  instructions for extracting a corner point feature set of a j-th image in the image data group, wherein 0≤j<C0;
  instructions for calculating a descriptor set corresponding to the corner point feature set; and
  instructions for using the corner point feature set and the descriptor set as feature information of the j-th image in the image data group.

11. The mobile device of claim 9, wherein the instructions for performing the loop closure detection in C0 sub-threads respectively based on the feature information to obtain the loop closure detection result of each sub-thread comprise:
  instructions for traversing the feature information of each image in a i-th sub-thread to obtain the loop closure detection result corresponding to the feature information of each image in the i-th sub-thread, wherein 0≤j<C0; and
  instructions for determining the loop closure detection result of the i-th sub-thread based on the loop closure detection result corresponding to the feature information of each image in the i-th sub-thread.

12. The mobile device of claim 11, wherein the instructions for traversing the feature information of each image in the i-th sub-thread to obtain the loop closure detection result corresponding to the feature information of each image in the i-th sub-thread comprise:
  instructions for inserting the feature information of a j-th image into a target loop closure database, wherein the target loop closure database is a i-th loop closure database of the i-th sub-thread, wherein 0≤j<C0;
  instructions for determining loop closure query frame information corresponding to the target loop closure database, and performing a loop closure frame information retrieval in the target loop closure database based on the loop closure query frame information;
  instructions for calculating an inlier point matching amount between the loop closure frame information and the loop closure query frame information, in response to the loop closure frame information being retrieved; and
  instructions for determining the loop closure detection result corresponding to the feature information of the j-th image in the i-th sub-thread based on the inlier point matching amount.

13. The mobile device of claim 12, wherein the instructions for determining the loop closure query frame information corresponding to the target loop closure database comprise:
  instructions for determining a sequence number of the loop closure query frame information in the target loop closure database based on the following formula:

$$c=(j+i)\%C0$$

where, c is the sequence number of the loop closure query frame information in the target loop closure database, and 0≤c<C0.

14. The mobile device of claim 11, wherein the instructions for determining the loop closure detection result of the i-th sub-thread based on the loop closure detection result corresponding to the feature information of each image in the i-th sub-thread comprise:
  instructions for selecting the loop closure detection result with a largest inlier point matching amount from the loop closure detection result corresponding to the feature information of each image in the i-th sub-thread to take as the loop closure detection result of the i-th sub-thread.

15. A non-transitory computer-readable storage medium storing one or more computer programs executable on a processor to implement a loop closure detection method, wherein the one or more computer programs comprise:
  instructions for collecting images in different detection directions simultaneously through C0 cameras installed on a mobile device to obtain an image data group comprising C0 images, wherein C0 is an integer larger than 1;
  instructions for calculating feature information of each image in the image data group;
  instructions for performing a loop closure detection in C0 sub-threads respectively based on the feature information to Obtain a loop closure detection result of each sub-thread, wherein each sub-thread corresponds to the loop closure detection in one detection direction; and
  instructions for determining a loop closure detection result of the mobile device based on the loop closure detection result of each sub-thread;
  wherein the instructions for determining the loop closure detection result of the mobile device based on the loop closure detection result of each sub-thread comprise:
    instructions for selecting the loop closure detection result with a largest inlier point matching amount from the loop closure detection results of the sub-threads to take as the loop closure detection result of the mobile device.

16. The storage medium of claim 15, wherein the instructions for calculating the feature information of each image in the image data group comprise:
  instructions for extracting a corner point feature set of a j-th image in the image data group, wherein 0≤j<C0;
  instructions for calculating a descriptor set corresponding to the corner point feature set; and
  instructions for using the corner point feature set and the descriptor set as feature information of the j-th image in the image data group.

17. The storage medium of claim 15, wherein the instructions for performing the loop closure detection in C0 sub-threads respectively based on the feature information to obtain the loop closure detection result of each sub-thread comprise:
  instructions for traversing the feature information of each image in a i-th sub-thread to obtain the loop closure detection result corresponding to the feature information of each image in the i-th sub-thread, wherein 0≤i<C0; and
  instructions for determining the loop closure detection result of the i-th sub-thread based on the loop closure detection result corresponding to the feature information of each image in the i-th sub-thread.

18. The storage medium of claim 17, wherein the instructions for traversing the feature information of each image in the i-th sub-thread to obtain the loop closure detection result corresponding to the feature information of each image in the i-th sub-thread comprise:
  instructions for inserting the feature information of a j-th image into a target loop closure database, wherein the target loop closure database is a j-th loop closure database of the i-th sub-thread, wherein 0≤j<C0;
  instructions for determining loop closure query frame information corresponding to the target loop closure database, and performing a loop closure frame information retrieval in the target loop closure database based on the loop closure query frame information;
  instructions for calculating an inlier point matching amount between the loop closure frame information and the loop closure query frame information, in response to the loop closure frame information being retrieved; and
  instructions for determining the loop closure detection result corresponding to the feature information of the j-th image in the i-th sub-thread based on the inlier point matching amount.

19. The storage medium of claim 18, wherein the instructions for determining the loop closure query frame information corresponding to the target loop closure database comprise:
  instructions for determining a sequence number of the loop closure query frame information in the target loop closure database based on the following formula:

$$c=(j+i)\%C0;$$

where, c is the sequence number of the loop closure query frame information in the target loop closure database, and 0≤c<C0.

20. The storage medium of claim 17, wherein the instructions for determining the loop closure detection result of the i-th sub-thread based on the loop closure detection result corresponding to the feature information of each image in the i-th sub-thread comprise:

instructions for selecting the loop closure detection result with a largest inlier point matching amount from the loop closure detection result corresponding to the feature information of each image in the i-th sub-thread to take as the loop closure detection result of the i-th sub-thread.

\* \* \* \* \*